United States Patent [19]

Barr

[11] 4,318,721
[45] Mar. 9, 1982

[54] COTTON GIN FILTER

[75] Inventor: Harry S. Barr, Charlotte, N.C.

[73] Assignee: Pneumafil Corporation, Charlotte, N.C.

[21] Appl. No.: 142,418

[22] Filed: Apr. 21, 1980

[51] Int. Cl.³ ............................................. B01D 50/00
[52] U.S. Cl. ....................................... 55/337; 55/400;
55/351; 55/290; 55/459 R
[58] Field of Search ............... 55/1, 96, 91, 290, 320,
55/323, 328, 332, 337, 351, 400, 430, 459 R;
19/40-42; 406/173, 171

[56] References Cited

U.S. PATENT DOCUMENTS

| | | | |
|---|---|---|---|
| 2,433,178 | 12/1947 | Ware | 19/41 |
| 3,086,348 | 4/1963 | Fowler et al. | 55/337 |
| 3,219,394 | 11/1965 | Moss et al. | 406/171 |
| 3,535,851 | 10/1970 | Riemsloh | 55/337 |
| 3,864,107 | 2/1975 | Baigas, Jr. | 55/290 |
| 4,045,194 | 8/1977 | Ferri | 55/290 |
| 4,180,390 | 12/1979 | Furstenberg | 55/385 R |

FOREIGN PATENT DOCUMENTS

| | | | |
|---|---|---|---|
| 944541 | 3/1936 | United Kingdom | 55/337 |
| 518105 | 2/1940 | United Kingdom | 55/337 |
| 751876 | 7/1956 | United Kingdom | 55/351 |
| 2019740 | 11/1979 | United Kingdom | 55/341 NT |
| 623568 | 8/1978 | U.S.S.R. | 55/320 |

Primary Examiner—Bernard Nozick
Attorney, Agent, or Firm—Robert W. Fiddler

[57] ABSTRACT

Apparatus for filtering air discharged from a cotton gin, so as to minimize the likelihood of contamination of the ambient atmosphere by airborne particulate waste from the gin. The exhaust air from the gin is fed to a housing containing, as initial filtering means, an inertial classifier in which relatively large particulate matter is screened from the air and dropped by gravity to the bottom of the housing below the inertial classifier screen, where it is collected and discharged, preferably by a compacting screw conveyor. A major part of the air along with entrained relatively smaller particles of foreign matter is passed through the inertial classifier screen. The filtered air passing through the inertial classifier screen, with the relatively smaller particles of foreign matter entrained therein and the particulate matter thrown up by the dropping of the initially screened relatively large particulate matter, is passed through a secondary filter, a rotary drum filter serving to remove the relatively smaller particulate matter, leaving relatively clean air for discharge from the housing to the atmosphere.

3 Claims, 2 Drawing Figures

COTTON GIN FILTER

BACKGROUND OF THE INVENTION

This invention relates to the art of air filtration and more particularly, to an improved filter for cleaning the air discharged from a cotton gin, so as to remove from the discharged air, that particulate matter which might contaminate the ambient atmosphere adjacent the gin.

The cotton ginning operation entails the agitation of cotton bolls, such as picked from the cotton plant, to separate the relatively light cotton fibers from the relatively heavier seeds, motes, leaves, and the like non-fibrous plant portions of the cotton boll. In mechanically breaking up the cotton bolls, so as to facilitate separation of these relatively light cotton fibers from the heavier seeds, motes, and leaf particles, it is found that airborne trash comprising dust, lint, fly and the like undesirable particulate matter is thrown into the ambient atmosphere surrounding the gin.

It has long been know, and as more recently recognized by the Environmental Protection Agency, EPA, the presence of this particulate matter in the atmosphere around the gin contaminates this atmosphere.

Attempts have been made to filter and remove undesired particulate matter from the discharge air from a cotton gin. However, where conventional filtering apparatus is employed, when the filtering medium is of a size having openings small enough to remove contaminating particles, the screen openings of these filters significantly interferes with the flow of air from the gin, particularly when these openings become clogged, as they do, with the relatively large particles normally entrained in the gin discharge airstream. Where the screen openings are of a size to permit free flow of air, contaminating particles are still left in the airstream.

BRIEF DESCRIPTION OF THE INVENTION

It is with the above considerations in mind, that the herein disclosed improved filtering arrangement of filtration have been evolved, serving to reduce the quantity of contaminating particulate matter in the air discharge from a cotton gin, prior to discharge of this air to the ambient atmosphere.

It is accordingly among the primary objects of this invention to provide improved filtration to eliminate atmosphere contaminating particles from the air discharged from a cotton gin.

Another object of the invention is to provide filtering means for the discharge air of a cotton gin which minimally interfere with air flow through the gin.

It is also an object of the invention to provide means permitting the separation of waste particles of different sizes from the discharge airstream from a cotton gin.

An additional object of the invention is to provide an improved apparatus for eliminating air contaminating particles from the air discharged from a cotton gin, with minimum interference with desired air flow through the gin.

A further object is to provide an apparatus for filtering air discharged from a cotton gin to insure removal of these air entrained particles.

These and other objects which will become hereafter apparent are achieved by a multi-step filtering operation in which there is an initial filtering operation providing a separation of relatively large particles from the gin discharge airstream, and then a subsequent separation of smaller particles from the air prior to discharge to the atmosphere. To this end, a filter housing is provided in which an inertial classifier is arranged to receive the discharge air from the gin, and in which the dirt laden air from the gin is fed into the interior of a cylindrical screen, with the air moving over and through the interior of the cylindrical screen surface, depositing particles larger than the screen openings on the interior surface of the screen. The screened relatively large particles are sufficiently slowed by the screen so that the weight of these screened particles causes them to fall to the bottom of the open inertial classifier separator screen. The air discharge through the inertial classifier screen still carries particles of a size smaller than the screen opening which it would be desired to remove. In order to accomplish this the air is fed through secondary filter means in the filter housing, so as to remove additional particles from the airstream. The removed particles both large and small are compacted and discharged from the filter housing.

A feature of the invention resides in the fact that by providing for a multiplicity of filtration steps, the rate of flow of the dirt laden air from the gin is not significantly effected, since the initial screening removes the large particle sizes which might have clogged a finer screen, with subsequent filtering operation serving to remove the smaller particles which have passed through the initial filtering apparatus.

BRIEF DESCRIPTION OF THE DRAWINGS

The particular details of the best mode contemplated for carrying out the invention and of the manner and process for making and using same, so as to enable those skilled in the art to practice the invention, will be described in full, clear, concise and exact terms, in conjunction with the accompanying drawings, wherein.

DESCRIPTION OF PREFERRED EMBODIMENT OF THE INVENTION

Figure 1:
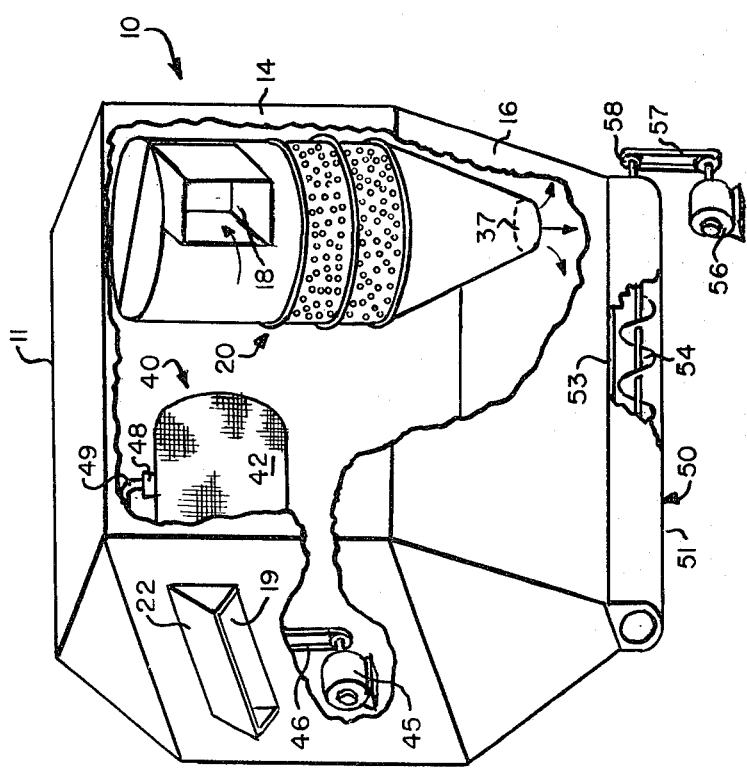
FIG. 1 is a perspective elevational view with parts broken-away of a filtering apparatus made in accordance with the teachings of the invention, showing the initial filtering means formed by an inertial classifier; and the secondary filter illustratively shown as formed by a rotary drum filter.

Referring now more particularly to the drawings, where like numerals in the various FIGS. will be employed to designate like parts, as seen in FIG. 1, the filtering apparatus is formed with a housing 10 formed preferably with a peaked roof 11, a rectangular in cross-section main portion 14, and a trough-like bottom hopper portion 16. Housing 10 is formed with an air inlet port 18, and an air outlet port 19. Air inlet 18 is coupled by suitable duct work to the air outlet of a gin, and housing air outlet 19 is arranged beneath hood 22.

Figure 2:
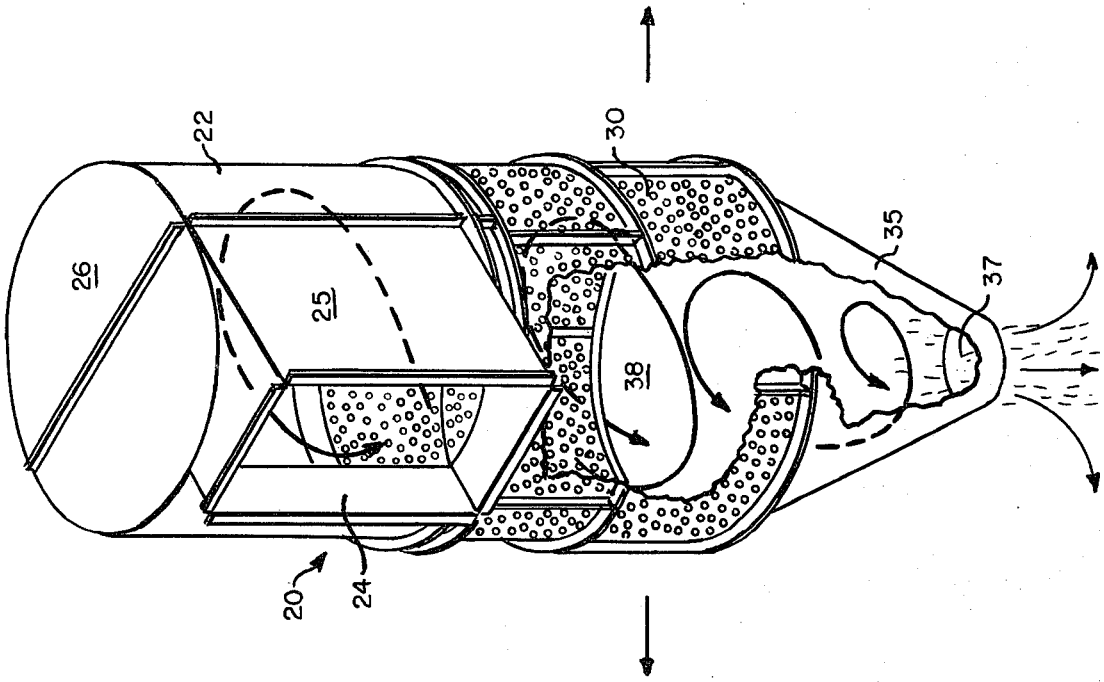
FIG. 2 is a perspective elevational view of the inertial classifier shown as employed for the initial filtering means.

Supported within housing 10, and coupled to the air inlet port 18, are initial filtering means 20, illustratively shown as formed by an inertial classifier, as best seen in FIG. 2. The inertial classifier as seen in FIG. 2, is shown as formed with a plenum 22 of a right circular cylindrical configuration having entry duct 24 of rectangular cross-section extending from inlet port 18, with sidewall 25 of duct 24 tangential to the cylindrical wall of plenum 22. The top of plenum 22 is closed by circular end plate 26, and the bottom of plenum 22 is open leading to right circular cylindrical screen 30, which is open at top and bottom and has a diameter substantially equal to that of the plenum 22. The open lower end of screen 30 is secured to the upper end of an exit cone 35, which as illustrated is of an inverted frustoconical configuration with lower discharge opening 37, and an open upper entry end 38 in communication with the open lower end of cylindrical screen 30.

The screen openings in cylindrical screen portion 30 are selected to be of a size such as to block the passage of most of the particulate waste entrained in the airstream passing into the plenum 22, while permitting at least 50%, and preferably 95%, of the air passing into the plenum to pass through the screen.

Arranged in housing 10, adjacent to, but at a spaced distance from, the initial filtering means 20, are secondary filtering means 40, illustratively shown as formed by a rotary drum filter having a right circular cylindrical screen surface 42 extending about a horizontal axis and closed at the right end, as viewed in FIG. 1, and open at the left end, to air outlet 19 of the housing. The rotary drum filter is mounted for rotation and is illustratively shown as rotated by means of motor 45, coupled via belt 46 to a drive member, such as a pulley, secured to the framework of the drum filter coaxially therewith, so that rotation imparted to the pulley will cause the drum to rotate. A stripper nozzle 48 coupled to a vaccum duct 49 is provided to move over the drum surface to facilitate removal of particulate matter screened from the airstream passing through the screen openings of the rotating drum.

Arranged at the bottom of housing 10, as illustratively shown in FIG. 1, are waste discharge means shown in the form of a compacting screw conveyor 50, have a chute 51 with an opening 53 in the chute receiving material dropping to the base of hopper 16. A screw 54 is mounted for rotation within chute 51 to receive and compact any particulate matter dropping to the bottom of housing 10. Screw 54 is illustratively shown as rotated by means of motor 56 driving belt 57 trained over pulley 58 on the screw shaft.

OPERATION

In use, a housing 10 of the above described and illustrated configuration is formed of conventionally available sheet materials fabricated in accordance with standard sheet material fabricating techniques. Thus, where sheet steel is employed, the sheets are cut to size and joined into a desired configuration by riveting, welding, sheet metal screws or the like. Mounted within the housing formed in the illustrated and described configuration are the initial and secondary filtering means, which are fabricated also by the utilization of conventional metal shaping and assembly techniques into the illustrated and described configuration, and supported in the housing by conventionally available structural support members.

In conventional use, the filtering apparatus is of a relatively large size standing more than 30 feet high and is generally contemplated for use in the field adjacent the cotton gin, so that the filtering components may be factory assembled and brought to the site for installation in the housing 10 at the time of erection. In use, the air inlet port 18 of the housing is coupled via conventionally available ducting of sheet metal, or the like, to the gin air outlet, so that the dirt laden air from the gin is fed to the housing 10. Air flow is provided by the fans or blowers conventionally employed in the gin to discharge air therefrom, or by such auxiliary blowers as may be found desirable arranged in the air flow path. The air fed into the plenum 22 is directed in a circular direction as a result of impingement thereof upon the interior cylindrically contoured walls of the plenum. The air and the particles entrained therein are slowed as a result of their diversion from a linear flow path to a circular flow path, so that the weight of the entrained particles will tend to cause them to drop from the air stream depending upon whether the vector component of their weight is greater than the vector component of the inertial force, tending to carry them along with the airstream. There is a further slowing of the air particles which are screened out on the interior surface of screen 30 which, as described, is formed of a mesh size such as to permit passage of a major part of the air, which will result in filtration of relatively large particles, but will still leave a fine dust in the air passing through the screen. The relatively larger particles removed from the airstream by the screen will tend to drop from the screen as a result of their weight, and those particles tending to remain on the screen surface as a result of the air movement through the screen, will be dislodged from the screen as a result of the washing effect of the air on the screen surface in its circular movement tangentially over the screen surface. The relatively larger particles screened from the airstream in this inertial classifier where the change of inertia of the entrained air particles results in classification or separation of the particles from the airstream are dropped through the discharge opening 37 at the lower end of exit cone 35, where they will fall to the bottom of hopper 16 through slot 53 into the compacting screw conveyor 50 for discharge.

In dropping from the discharge opening 37, along with a minor portion of the air, there will be a meaningful amount of particulate matter still left in the air coming from the initial filtering means 20, formed by the inertial classifier. This contamination, along with the relatively smaller particles remaining in the major part of the air passing through the screen 30, is then directed to the rotary drum filter mounted for rotation adjacent to and in air intercepting relationship with air flow through the housing 10 through outlet port 19. The filtering medium of the rotary drum filter is selected of a porosity such as to remove any residual particulate matter in the airstream above an undesirable air contaminating amount.

The rotary drum filter is set into rotation with the air flowing from the exterior of the screen 42 into the interior of the cylindrically-shaped screen and out through discharge port 19. The screen is preferably rotated to facilitate the dislodgement of any particulate matter accumulated on the screen, and the screen can be further cleaned by the utilization of one or more suction nozzles arranged to sweep over the screen surface, sucking any accumulated particulate matter from the screen surface and carrying it off to the appropriate collection point.

The housing, as illustratively shown, is preferably formed with a peaked roof 11, and outlet opening hood 22. The peaked roof 11 facilitates the shedding of rain and any other roof accumulation which might damage the housing, and hood 22 similarly prevents rain from entering the housing.

It is thus seen that all particles deleterious to health may be removed from the air, without blocking necessary air flow.

The above disclosure has been given by way of illustration and elucidation, and not by way of limitation, and it is desired to protect all embodiments of the herein disclosed inventive concept within the scope of the appended claims.

What is claimed is:

1. Apparatus for filtering atmosphere contaminating particles from the air discharged from a cotton gin, said apparatus comprising:

a housing having an air inlet adapted for coupling to the gin to receive air discharged from the gin;

an inertial classifier having a cylindrical inlet plenum and tangential inlet connected to the housing inlet in said housing, slowing down the movement of relatively large particles in the air flowing into said housing from the gin causing same to drop from the airstream;

a cylindrical screen beneath the plenum forming part of said classifier through which a major part of the air fed into said housing is passed along with relatively smaller particles, said screen having openings through which the relatively large particles may not pass while passing at least 50% of the air and the relatively smaller particles entrained therein;

a.secondary filter in said housing having a rotating cylindrical screen through which the air and particles passing from said cylindrical screen of said inertial classifier is fed, said secondary filter screen having openings filtering the relatively smaller particles of air from the air passed to said secondary filter;

an air discharge opening in said housing through which air from which contaminating particles have been removed is passed to the ambient atmosphere; and a compacting screw conveyor at the bottom of said housing to discharge the particles filtered from the air passing through said housing.

2. Apparatus as in claim 1, in which said housing is formed with an inclined roof surface.

3. Apparatus as in claim 1, in which said housing is formed with a hood over said air discharge opening.

* * * * *